Oct. 25, 1960   L. A. BOTKIN   2,957,504
SEAL ARRANGEMENT FOR NOZZLE AND FITTING
Filed March 4, 1959
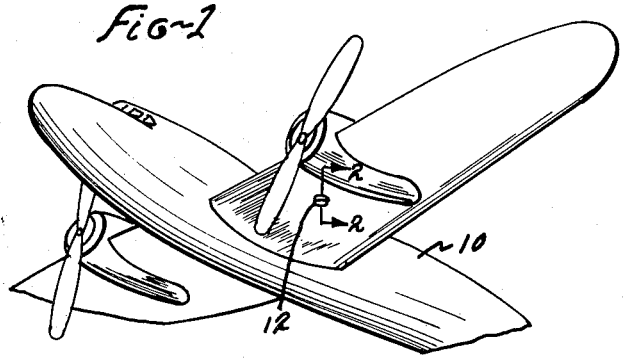
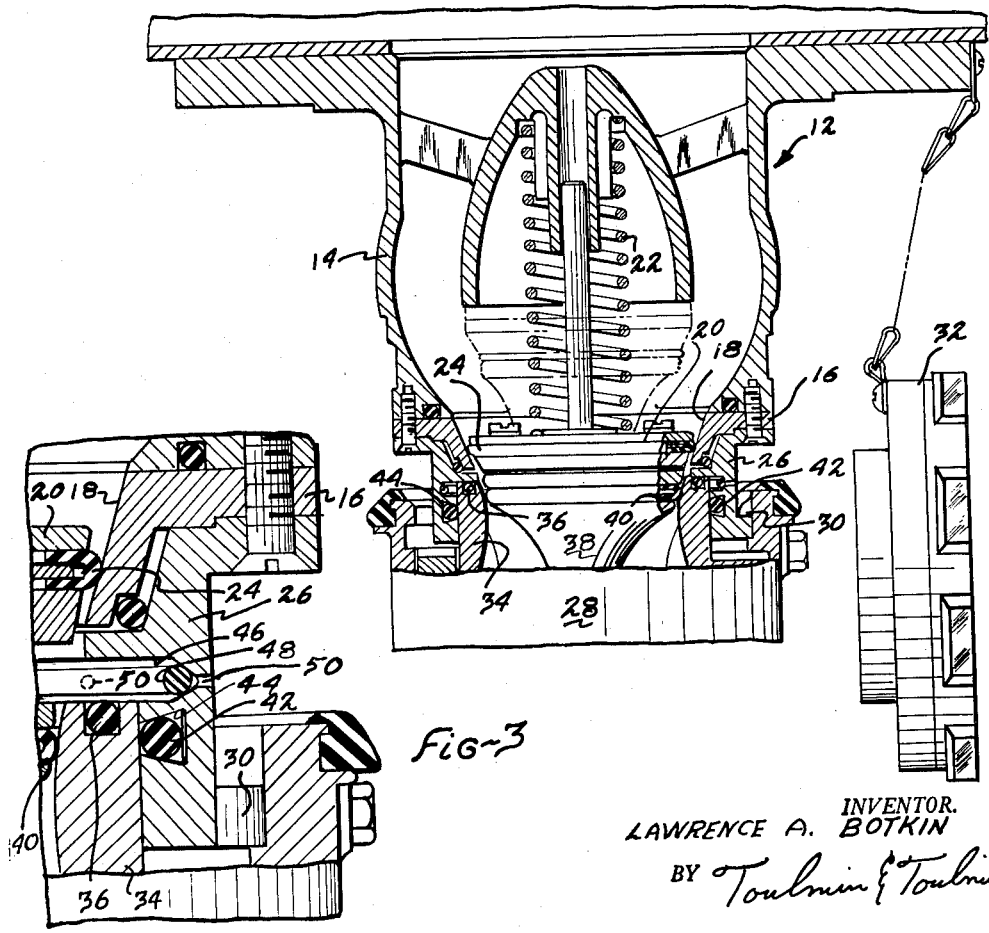
INVENTOR.
LAWRENCE A. BOTKIN
ATTORNEYS United States Patent Office 2,957,504
Patented Oct. 25, 1960

2,957,504
SEAL ARRANGEMENT FOR NOZZLE AND FITTING

Lawrence A. Botkin, Dayton, Ohio, assignor to Buckeye Iron & Brass Works, Dayton, Ohio, a corporation of Ohio Filed Mar. 4, 1959, Ser. No. 797,137
7 Claims. (Cl. 141—349)

This invention relates to improvements in fluid flow adapter fittings, particularly to adapters for attaching nozzles or couplings to relatively large storage and supply tanks such as the fuel tanks of aircraft, diesel locomotives, tank trucks, power boats and the like, or for coupling together fluid supply lines or for making connections in hydrant systems at the ends of the branch conduits thereof.

A fuel filling adapter embodying the basic design with which the present invention is concerned, is illustrated and described in United States Patent No. 2,753,884, and a fluid nozzle adapted for use with such an adapter is illustrated and described in United States Patent No. 2,737,401.

The adapter illustrated in the patent identified above and which in that case is a fuel filling adapter, together with the nozzle similarly identified forms a satisfactory way for effectively coupling conduits for filling containers and the like. The sealing between the adapter fitting and the nozzle to prevent leakage of the fluid is also quite effective. However, it has been found that with the effective seals necessary to prevent leakage, when the adapter is closed, and the nozzle is closed, it sometimes becomes quite difficult to remove the nozzle from the adapter due to the suction created when the nozzle is withdrawn from the adapter. Since these nozzles and adapters sometimes reach substantial sizes, up to two and three inches in effective diameter, the suction tending to hold the nozzle on the adapter may even approach 100 pounds in extreme cases. This introduces the possibility, when the nozzle is separated from the adapter, of the valve member of one or the other of the nozzle and adapter becoming damaged, or the valve of the nozzle being drawn outwardly and with a possible loss of fluid from the nozzle which, if the fluid is corrosive or flammable, might be dangerous.

With the foregoing in mind, it is a particular object of this invention to provide an adapter fitting of the nature referred to in which adequate sealing between a filling nozzle attached to the adapter and the adapter is maintained but without causing any difficulty in connection with dis-engaging the nozzle from the adapter.

Heretofore, the sealing between nozzles and adapters of the nature described has been at the end of the nozzle and this has introduced the possibility of the nozzle tilting in the adapter and causing leakage or undue wear about the engaging portions of the nozzle and adapter. With this in mind, a still further object of the present invention is the provision of additional sealing means in the adapter beyond what is presently provided to assist in supporting the nozzle against deflection and also to improve the seal between the nozzle and the adapter.

A still further object of this invention is the provision of a simple arrangement for maintaining an absolutely fluid-tight seal against leakage between a pair of telescopically interfitted members while at the same time permitting free relief of any suction developed between the members and to accomplish the foregoing in a very simple and inexpensive manner.

These and other objects and advantages will become more apparent upon reference to the drawings in which:

Figure 1 is a perspective view showing one instance wherein a fuel filling adapter according to the present invention is employed;

Figure 2 is a vertical section through the fuel filling adapter as indicated by line 2—2 on Figure 1 showing a filling nozzle attached to the adapter; and Figure 3 is a fragmentary view taken at enlarged scale showing the auxiliary seal of the adapter member and the seal for the vacuum relief arrangement according to the present invention.

Referring to the drawings somewhat more in detail, Figure 1 illustrates an aircraft 10 having wing tanks adapted for being filled through a fuel filling adapter 12 which may be mounted on the underside of the wing. This adapter could, of course, be mounted on top of the wing or in any other tank or container which it is desired to fill with fuel, and accordingly, the showing of Figure 1 is intended merely as an illustration of one circumstance in which the adapter could be used.

Turning now to Figure 2, it will be seen that the fuel filling adapter 12 has a flow passage 14 therethrough for the passage of fuel and that at the lower end of the adapter there is a ring 16 having a tapered seat 18 against which a valve member 20 seats under the action of a spring 22. A rubber-like ring 24 on the valve member provides a resilient fluid-tight engagement of the valve member with the tapered valve seat.

Beneath ring 16 is a cylindrical member 26 which extends downwardly and forms the portion of the filling adapter fitting which telescopically receives the end of the fuel filling nozzle 28. The lower end of the cylindrical member 26 and the upper end of nozzle 28 comprises cooperating element of a bayonet latch generally indicated at 30 so that the nozzle can be latched to the adapter preparatory to the flow of fluid therethrough. When the nozzle is detached a cap 32 is attached to the lower end of the fuel filling adapter and serves as a closure therefor.

The nozzle 28 has a projecting cylindrical portion 34 that slidably fits within cylindrical member 26 of the adapter. At its upper end cylindrical portion 34 of the nozzle has an O ring 36 that seats against a radial flange on the inside of member 26 to form a seal between the nozzle and the adapter fitting. The upper end of cylindrical portion 34 of the nozzle is outwardly tapered and forms a seat for the nozzle valve member 38 which also has a rubber-like ring 40 to provide for a resilient fluid-tight seating of the valve member against its seat.

In operation, the nozzle is coupled to the adapter, and the valve member 38 of the nozzle is pushed upwardly which in turn pushes the valve member 20 of the adapter upwardly and opens the passage for the supply of fuel in one direction or the other through the nozzle and adapter.

After the operation is completed the valve member of the nozzle is closed and this permits the adapter valve member to close and thereafter the nozzle is uncoupled from the adapter and the cap 32 is replaced on the adapter.

According to the present invention additional support is provided for the nozzle in the form of annular O ring 42 which is received within a groove 44 extending about the inside of cylindrical member 26 between the lower end thereof and the aforementioned radial flange against which O ring 40 of the nozzle seats. This added O ring supports the nozzle against lateral movement and assists in guiding it into the proper place within the adapter, and provides added protection against leakage from between the nozzle and adapter. However, when the nozzle is to be separated from the adapter a suction is drawn between the valve members of the nozzle and adapter and this suction can develop quite high forces up to 100 pounds or can cause the valve member of the nozzle to be drawn open and fuel spilled therefrom.

According to this invention the advantages of the added support and seal of the additional O ring 42 is gained without the drawbacks referred to above by providing in the cylindrical member 26 between O ring 40 and the valve member of the adapter an annular V groove 46 which forms a wedge shaped seat for an O ring 48 and with there being drilled holes 50 extending from the bottom of groove 46 to the atmosphere.

Drilled holes 50 may be fairly small, say, about 0.050 inch in diameter and there may be up to 6 of the holes provided. The groove 46 may be up to about ¼ of an inch at its widest part and O ring 48 will be somewhat smaller, say, from ⅛ to ³⁄₁₆ of an inch in diameter. O ring 48 is of such a size that it fits closely within groove 46 engaging the tapering sides of the groove under at least slight pressure so that no pressure can be expelled from the inside of the adapter outwardly through holes 50. However, due to the extreme flexibility of O ring 48, even a slight suction inside the adapter member is sufficient for the air entering through holes 50 to deform the O ring slightly and thus relieve the suction by a supply of atmosphere. The net result is that no amount of pressure escaping past the end of the nozzle of O ring 40 will cause any leakage, whereas, when the nozzle is uncoupled from the adapter, there is no resistance to removing of the nozzle from the adapter and no tendency for the valve member of the nozzle to be drown open by suction between the nozzle and the adapter. Such a condition of suction is substantially entirely relieved through holes 50 and past O ring 48.

It will be understood that this invention is susceptible to modification in order to adapt it to different usages and conditions; and, accordingly, it is desired to comprehend such modifications within this invention as may fall within the scope of the appended claims.

I claim:

1. A fitting for receiving a nozzle having a cylindrical discharge end to establish a fluid tight flow passage comprising; a cylindrical member adapted for fitting closely about the cylindrical end of the nozzle, a radial flange in the member to engage the end of the nozzle, spaced resilient seal means between the end of the nozzle and the flange and between the inside of the member and the peripheral portion of the nozzle, and means in the cylindrical member between said seal means operable to admit air into the cylindrical member in response to suction created therein while preventing fluid from leaking from the cylindrical member due to pressure established therein.

2. A fitting for receiving a nozzle having a cylindrical discharge and to establish a fluid tight flow passage comprising; a cylindrical member adapted for fitting closely about the cylindrical end of the nozzle, a radial flange in the member to engage the end of the nozzle, a rubber-like seal between the end of the nozzle and the flange, a second rubber-like seal between the inside of the member and the outside of the nozzle spaced from the said first seal, port means communicating the inside of the member between the seals with the atmosphere, and means associated with the port means operable to permit air to enter said member through said port means while preventing fluid from passing from said member.

3. A fitting for receiving a nozzle having a cylindrical discharge end to establish a fluid tight flow passage comprising; a cylindrical member adapted for fitting closely about the cylindrical end of the nozzle, a radial flange in the member to engage the end of the nozzle, spaced annular rubber-like seals between the nozzle and the member fluid tight, a groove in the cylindrical member between said seals, port means connecting the bottom of the groove with the atmosphere, and an O ring in the groove preventing flow outwardly through the port means while permitting atmosphere to flow inwardly through the port means to relieve suction between the said seals.

4. In combination; a nozzle having a cylindrical end part, a rubber-like seal ring on the extreme end of the end part, an adapter fitting pertaining to a receiver to receive fluid from the nozzle, said adapter fitting comprising a portion having a cylnidrical recess to receive the said end part of the nozzle comprising a flange to abut the seal ring on th eend of the nozzle, a rubber-like seal carried on the inside of said cylindrical portion to engage the periphery of the said end part of the nozzle at a region spaced from the said seal ring, means for latching the nozzle to the adapter fitting, and means in the adapter fitting between the seal ring and seal operable to relieve suction therebetween while preventing escape of pressure.

5. In combination; a nozzle having a cylindrical end part, a rubber-like seal ring on the extreme end of the end part, an adapter fitting, said adapter fitting comprising a portion having a cylindrical recess to receive the said end part of the nozzle comprising a flange to abut the seal ring on the end of the nozzle, a rubber-like seal carried on the inside of said cylindrical portion to engage the periphery of the said end part of the nozzle at a region spaced from the said seal ring, means for latching the nozzle to the adapter fitting, a valve member in the nozzle movable outwardly thereof to open the flow passage through the nozzle, a valve member in the adapter fittin gmovable inwardly thereof to open the flow passage therethrough, said valve members being substantially in face to face relation when the nozzle is attached to the adapter fitting whereby opening of the nozzle valve member will open the adapter fitting valve member, a groove in the inside of the adapter fitting between the said seal and seal ring, ports through the wall of the adapter fitting in the bottom of the groove, and a rubber-like ring resting in the groove to seal the ports against outflow therethrough while permitting inflow therethrough.

6. In combination; a nozzle having a cylindrical end part, a rubber-like seal ring on the extreme end of the end part, an adapter fitting pertaining to a receiver to receive fluid from the nozzle, said adapter fitting comprising a portion having a cylindrical recess to receive the said end part of the nozzle comprising a flange to abut the seal ring on the end of the nozzle, a rubber-like seal carried on the inside of said cylindrical portion to engage the periphery of the said end part of the nozzle at a region spaced from the said seal ring, means for latching the nozzle to the adapter fitting, said nozzle tapering outwardly at the end and said adapter fitting tapering inwardly, valve members having rubber-like peripheries in the outer ends of the nozzle and adapter fitting which are substantially in face to face engagement when the nozzle and fitting are coupled together so outward movement of the nozzle valve member will cause inward movement of the valve member of the adapter fitting to permit fluid flow therethrough, a V groove in the inside of the adapter member between the seal and seal ring, a rubber-like O ring in the groove engaging the sides thereof, and port means leading from the bottom of the groove to the atmosphere.

7. In combination; a nozzle having a cylindrical end part, a rubber-like seal ring on the extreme end of the end part, an adapter fitting pertaining to a receiver to receive fluid from the nozzle, said adapter fitting comprising a portion having a cylindrical recess to receive the said end part of the nozzle comprising a flange to abut the seal ring on the end of the nozzle, a rubber-like seal carried on the inside of said cylindrical portion to engage the periphery of the said end part of the nozzle at a region spaced from the said seal ring, means for latching the nozzle to the adapter fitting, said nozzle tapering outwardly at the end and said adapter fitting tapering inwardly, valve members having rubber-like peripheries in the outer ends of the nozzle and adapter fitting which are substantially in face to face engagement when the nozzle and fitting are coupled together so outward movement of the nozzle valve member will cause inward movement of the valve member of the adapter fitting to permit fluid flow therethrough, a V groove in the inside of the adapter member between the seal and seal ring, a rubber-like O ring in the groove engaging the sides thereof, and port means leading from the bottom of the groove to the atmosphere, said O ring being in pressure engagement with the surface of said groove.

References Cited in the file of this patent

UNITED STATES PATENTS

| | | |
|---|---|---|
| 2,629,395 | Krone et al. | Feb. 24, 1953 |
| 2,630,822 | Davies | Mar. 10, 1953 |
| 2,713,989 | Bryant | July 26, 1955 |
| 2,753,884 | Lindsay | July 10, 1956 |